H. MORRIS.
AUTOMATIC LIQUID MEASURING DEVICE.
APPLICATION FILED APR. 12, 1909.
962,911.
Patented June 28, 1910.
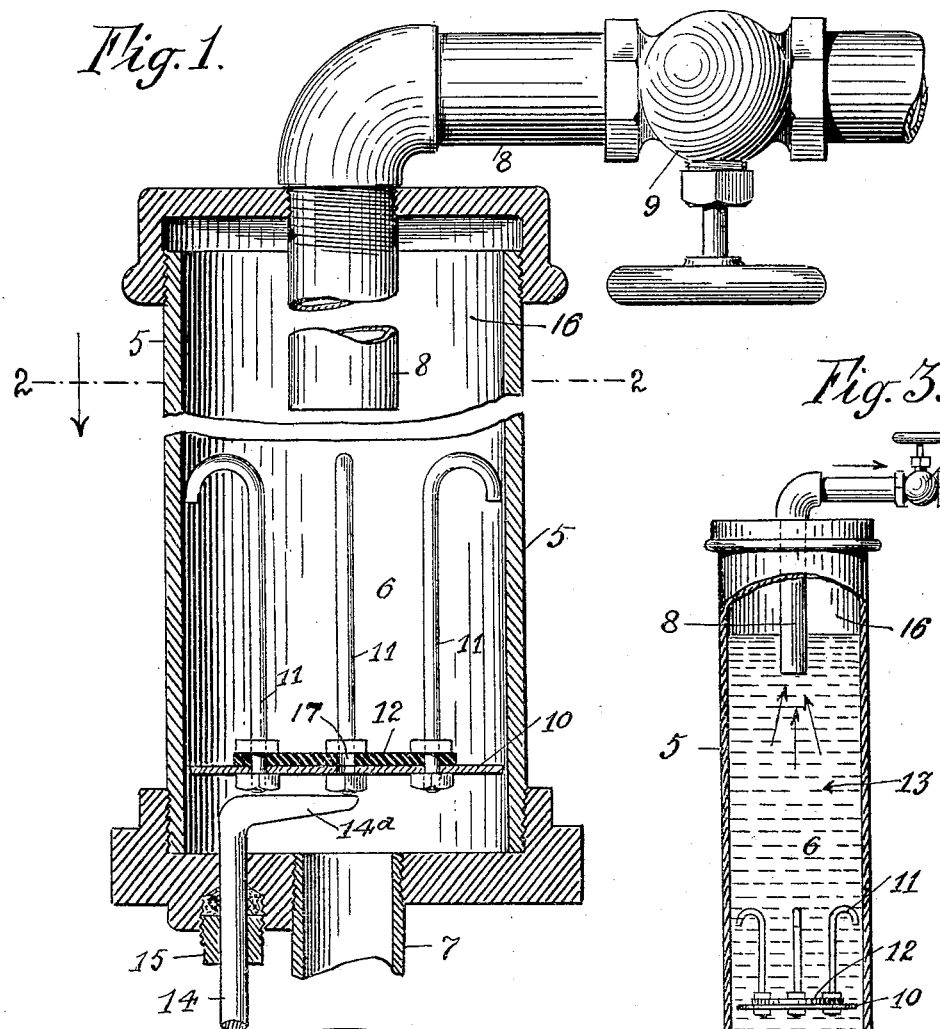
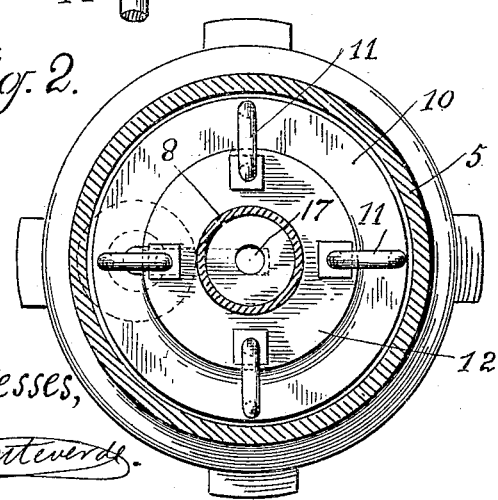

UNITED STATES PATENT OFFICE.

HOMER MORRIS, OF LOS ANGELES, CALIFORNIA, ASSIGNOR OF ONE-HALF TO H. R. GAGE, OF OCEANPARK, CALIFORNIA.

AUTOMATIC LIQUID-MEASURING DEVICE.

962,911.  Specification of Letters Patent.  Patented June 28, 1910.

Application filed April 12, 1909. Serial No. 489,465.

*To all whom it may concern:*

Be it known that I, HOMER MORRIS, a citizen of the United States, residing at Hermosa Beach, county of Los Angeles, and State of California, have invented new and useful Improvements in Automatic Liquid-Measuring Devices, of which the following is a specification.

My invention relates to an automatic measuring device which is operated by the flow of the liquid therethrough to almost entirely cut off the flow of liquid when a predetermined quantity of liquid has passed out of the delivery pipe, so that the operator can then completely close off the flow, or when an automatic valve is used on the discharge pipe the diminution of the flow of liquid will permit the valve to seat itself and thereby stop the flow. And the object thereof is to produce a simple and efficient device for that purpose, which can be regulated to discharge different quantities of liquid, depending upon the point at which the regulating device is set.

I accomplish this object by the mechanism described herein and illustrated in the accompanying drawings in which;

Figure 1 is an enlarged central section partly broken away of the measuring apparatus and showing a part of the discharge pipe. Fig. 2 is a section on the line 2—2 of Fig. 1. Fig. 3 is a central section of the measuring apparatus on a reduced scale to that shown in Fig. 1.

In the drawings 5 is the casing of the measuring chamber 6, which is of a capacity adapted to hold the maximum quantity of liquid desired to be measured. A supply pipe 7 enters the bottom of the measuring chamber and is connected to a source of supply not shown that will deliver the liquid into the measuring chamber under pressure. Projecting down through the top of the chamber is the discharge pipe 8 which turns horizontally and then downwardly when it is desired to catch the liquid in a vessel held below the discharge. The discharge pipe is provided with a cock 9 to cut off the flow of liquid through the discharge pipe.

When using my measuring device in connection with my flushing apparatus, for which I filed an application for U. S. Letters Patent March 22nd, 1907, Ser. No. 363,978, the valve chamber and valve of that application would be substituted for the regulating cock 9.

In the measuring chamber is an annular reduction disk 10 which is provided on its upper side with guide rods 11, the upper ends of which curve outwardly and downwardly and lie close to the casing, so as to guide the reduction disk in its movement in the measuring chamber as hereafter explained.

On the top of the reduction disk I preferably secure a packing disk 12 of rubber, but this packing disk can be omitted if desired. I prefer its use because when the reduction disk contacts with the inner end of the discharge pipe there is no noise produced and a better contact is thereby provided than without such packing. A central aperture 17 is provided through the reduction disk and packing so that the pressure on both sides of the same may equalize when they reach the end of the discharge pipe and the cock on the discharge pipe is closed. The aperture through the reduction disk and packing and the space between the outer edge of the reduction disk and the casing of the chamber when added together are preferably less than the area of the discharge pipe. The distance between the outer edge of the reduction disk and the interior of the casing of the measuring chamber is sufficient to provide ample clearance room for the disk as it moves up and down in the chamber.

In the operation of my device when the valve on the discharge pipe is open the liquid 13 in the chamber is forced out through the discharge pipe by the incoming liquid. This incoming flow causes the movement of the reduction disk upwardly until it contacts with the bottom or inner end of the discharge pipe when the flow of liquid through the discharge pipe is almost entirely cut off, as the central aperture is preferably very small. As soon as the flow of liquid from the discharge pipe is thus almost entirely cut off the valve on the discharge pipe is closed by the operator, or if it is an automatic valve like that referred to in my flushing apparatus application, the valve instantly seats itself and the further flow of liquid is cut off. In order to regulate the quantity of liquid to be discharged from the measuring chamber, I provide a regulating rod 14, which has a head 14ª which contacts with the underside of the reduction disk when no liquid is flowing through the chamber. A stuffing box 15 provides a liquid tight joint between the regulating rod and the casing of the measuring chamber. By loosening the gland the regulating rod can be raised so as to project farther into the chamber and hold the reduction disk normally closer to the discharge pipe, thereby reducing the amount of liquid that will flow out of the measuring chamber before the disk contacts with the inner end of the discharge pipe. By projecting the inner end of the discharge pipe downwardly into the measuring chamber as shown in the drawings, an air chamber 16 is formed in the upper end of the casing of the measuring chamber around the projecting end of the discharge pipe which prevents any liquid hammer when the flow of liquid is stopped. The measuring chamber is preferably placed vertically and the weight of the reduction disk and connected parts and the combined area of the central aperture and passage way around the reduction disk have a bearing upon the quantity of liquid which will be discharged from the measuring chamber before the reduction disk contacts with the inner end of the discharge pipe. The heavier the reduction disk and its connected parts the slower it will move upwardly and the longer time it will take for it to engage the inner end of the discharge pipe. The more nearly the diameter of the reduction disk approaches the diameter of the measuring chamber the more quickly it will be forced upwardly into contact with the inner end of the discharge pipe. The regulating rod will be placed at that point in the measuring chamber that will hold the reduction disk normally at a point so that the inflowing liquid will carry the disk into contact with the inner end of the discharge pipe whenever the desired quantity of liquid has been discharged therefrom. After it has once been set the subsequent operation of the apparatus will always cause the discharge of the same quantity of liquid. As soon as the valve on the discharge pipe has been closed the reduction disk will settle of its own weight in the liquid in the measuring chamber until it reaches the head of the regulating rod. This action is shown as taking place in Fig. 3, the regulating disk 10 being shown as settling down upon the head 14ª of the regulating rod 14.

Having described my invention what I claim is:

1. A device for measuring liquids comprising a vertical measuring chamber; an inlet pipe opening into said measuring chamber opening at the bottom thereof; a discharge pipe opening out of the top of said measuring chamber; a valve on said discharge pipe; a reduction disk having a central aperture therein in said measuring chamber; means to guide said reduction disk in its rise and fall in said chamber and retain the same in a horizontal position; and means to regulate the distance of movement of said reduction disk in said chamber.

2. A device for measuring liquids comprising a measuring chamber; an inlet pipe opening into said measuring chamber at the bottom thereof; a discharge pipe opening into and projecting a short distance into the top of said measuring chamber; a valve on said discharge pipe; a reduction disk having a central aperture therein in said measuring chamber; guides secured to said disk; and means to regulate the position in said chamber of said reduction disk.

In witness that I claim the foregoing I have hereunto subscribed my name this 5th day of April, 1909.

HOMER MORRIS.

Witnesses:
G. E. HARPHAM,
S. B. AUSTIN.